United States Patent
Amidhozour et al.

(10) Patent No.: US 6,381,510 B1
(45) Date of Patent: Apr. 30, 2002

(54) METHODS AND APPARATUS FOR FACILITATING ELECTRONIC COMMERCE IN AREA RUGS

(75) Inventors: Rahim Amidhozour, Woodside; Hooshyar F. Naraghi, Menlo Park, both of CA (US)

(73) Assignee: Eruggallery.com, San Carlos, CA (US)

( * ) Notice: Subject to any disclaimer, the term of this patent is extended or adjusted under 35 U.S.C. 154(b) by 0 days.

(21) Appl. No.: 09/444,056

(22) Filed: Nov. 19, 1999

(51) Int. Cl.⁷ .............................................. G06F 17/60
(52) U.S. Cl. ....................................... 700/130; 705/27
(58) Field of Search ............................... 700/130, 143; 705/27, 26, 37; 345/352, 353

(56) References Cited

U.S. PATENT DOCUMENTS

| | | |
|---|---|---|
| 3,757,037 A | 9/1973 | Bialek |
| 4,775,935 A | 10/1988 | Yourick |
| RE33,316 E | 8/1990 | Katsuta et al. |
| 4,992,940 A | 2/1991 | Dworkin |
| 5,053,956 A | 10/1991 | Donald et al. |
| 5,276,805 A | 1/1994 | Hamaguchi et al. |
| 5,414,621 A | 5/1995 | Hough |
| 5,428,727 A | 6/1995 | Kurosu et al. |
| 5,579,471 A | 11/1996 | Barber et al. |
| 5,664,111 A | 9/1997 | Nahan et al. |
| 5,708,780 A | 1/1998 | Levergood et al. |
| 5,715,314 A | 2/1998 | Payne et al. |
| 5,751,286 A | 5/1998 | Barber et al. |
| 5,751,829 A | 5/1998 | Kubo et al. |
| 5,761,655 A | 6/1998 | Hoffman et al. |
| 5,768,142 A | 6/1998 | Jacobs et al. |
| 5,852,823 A | 12/1998 | De Bonet et al. |
| 5,857,174 A | 1/1999 | Dugan |
| 5,875,110 A | 2/1999 | Jacobs et al. |
| 5,878,401 A | 3/1999 | Joseph et al. |
| 5,898,594 A | 4/1999 | Leason et al. |
| 5,903,878 A | 5/1999 | Talati et al. |
| 5,911,131 A | 6/1999 | Vig |
| 5,911,139 A | 6/1999 | Jain et al. |
| 5,960,407 A | 9/1999 | Vivona |
| 5,960,411 A | 9/1999 | Hartman et al. |
| 6,026,377 A * | 2/2000 | Burke .......................... 705/27 |
| 6,058,417 A * | 5/2000 | Hess et al. ................. 705/27 X |
| 6,202,051 B1 * | 3/2001 | Woolston ..................... 705/27 |

FOREIGN PATENT DOCUMENTS

| | | |
|---|---|---|
| DE | 19638548 | 3/1998 |
| EP | 0657831 | 6/1995 |
| GB | 2330930 | 5/1999 |
| JP | 10162020 | 6/1998 |
| JP | 11175724 | 7/1999 |

OTHER PUBLICATIONS

Lee et al. "Query by Image Content Using Multiple Objects and Multiple Features: User Interface Issues", *Proceedings of the International Conference on Image Processing (ICIP)*, US, Los Alamitos, IEEE Comp. Soc. Press, vol. 1, Conf. 1, pp. 76–80 (Nov. 13, 1994).

Universal Product Code, Chapter I: Standard Number and Bar Code Concepts, *Uniform Code Council, Inc.*, Jun. 1995.

www.buyrug.com wetsite printout on Sep. 24, 1999 (3 pages).

\* cited by examiner

*Primary Examiner*—Peter Nerbun
(74) *Attorney, Agent, or Firm*—Fish & Neave; Nicola A. Pisano; Michael J. DeHaemer, Jr.

(57) ABSTRACT

Methods and apparatus are provided for facilitating the sale and distribution of handmade rugs. High resolution images are obtained of rugs in the inventories of many rug merchants. The rugs are classified based on their age, size, color, condition, layout, pattern, the type of pile and foundation materials, the knot, their overall design, and where they were made. Then the images and attribute data are stored in a database. The database may be searched based on the attributes. Alternatively, searches may be performed graphically.

21 Claims, 6 Drawing Sheets

FIG. 5

UPC: 1 0 5 0 8 1 3 1 1 2 1 1 6 1 2 1 1 1 4 2 2 1 0 0 0 1 0 0 0 0 0

- Size
- Colors
- Layout
- Pattern
- Style
- Make
- Pile
- Weave
- Foundation
- Knot
- Category
- Age
- Condition/Repairs

| Category | Sub | Description |
|---|---|---|
| Size | Shape | 1=rectangular, 2=runner, 3=square, 4=round, 5=oval, 6=odd shape |
| | Dimension | WWLL, where WW=width and LL=length, both in feet |
| Colors | Dye type | 1=natural, 2=synthetic, 3=natural-synthetic |
| | Background | 1=red, 2=blue, 3=beige, 4=ivory, 5=peach, 6=green, 7=brown/camel, 8=grey/silver, 9=gold, A=black, B=rust, C=White, D=yellow, E=orange, F=pink, G=purple |
| | Border | |
| Layout | | 1=medallion, 2=all-over, 3=one-sided |
| Pattern | | 1=curvilinear, 2=geometric, 3=pictorial |
| Style | Main | 1=Persian, 2=Chinese, 3=Turkoman, 4=Caucasian, 5=European, 6=Anatolian, 7=Tibetan, 8=Indian, 9=Baluchi, A=North African, B=Native American, C=Turkestan |
| | Substyle | A value from 01-99 depending on the major style |
| Make | | 1=Iran, 2=India, 3=China, 4=Pakistan, 5=Turkey, 6=Afghanistan, 7=Armenia/Azerbaijan/Georgia, 8=Morocco/Algeria/Tunisia. 9=Turkmenistan/Kazakhstan/Uzbekistan, A=Tibet/Nepal, B=Romania/Bulgaria/Albania, C=Egypt, D=France, E=North America, F=Ireland, G=Spain |
| Pile | | 1=wool, 2=silk, 3=wool-silk, 4=cotton |
| Weave | | 1=pile, 2=flat |
| Foundation | | 1=cotton, 2=wool, 3=silk |
| Knot | Type | 1=asymmetric, 2=symmetric |
| | Density | 1= less than 210, 2= 210-329, 3= 330-474, 4=475-649, 5=650-849, 6=850-1064, 7=1065-1319, 8= more than 1319 (all in knots per square inch) |
| Category | | 1=nomadic, 2=village, 3=workshop, 4=master workshop, 5=machined |
| Age | | 1=contemporary, 2=semi-antique, 3=antique |
| Condition | | cddddddddd, where c is encoded as 1=fine, 2=average, 3=worn, d is encoded as 0=Ok, 1=repaired or damaged, and where position maps to the rug as shown: tl,tc,tr,cl,cc,cr,bl,bc,br ⟷ [tl tc tr / cl cc cr / bl bc br] |

|  | Curvilinear | Geometric | Pictorial |
|---|---|---|---|
| Medallion | 24% | 14.8% | -- |
| All-over | 24% | 14.8% | -- |
| One-sided | 12% | 7.4% | 3% |

| Red | 20% | Peach, Green, Brown/Camel, Grey/Silver, Gold, Black | 5% each | Rust, White, Yellow, Orange, Pink, Purple | 4% each |
|---|---|---|---|---|---|
| Blue | 10% | | | | |
| Beige | 8% | | | | |
| Ivory | 8% | | | | |

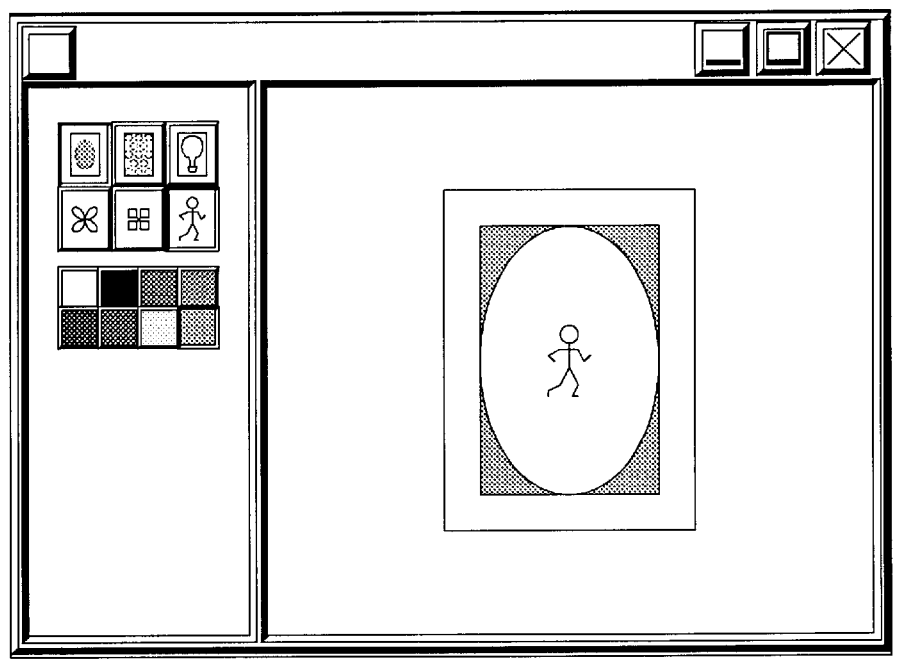

METHODS AND APPARATUS FOR FACILITATING ELECTRONIC COMMERCE IN AREA RUGS

FIELD OF THE INVENTION

The present invention generally relates to methods and apparatus for facilitating electronic commerce in area rugs, and more particularly to the creation of a virtual marketplace for handmade rugs, and rugs in the style of handmade rugs.

BACKGROUND OF THE INVENTION

Unlike the market for commodity items, the market for handmade rugs tends to be small and fragmented. For example, in even a small community there may be dozens of places to purchase a pair of blue jeans, whereas even the largest cities may have only a relatively small number of places to buy a handmade rug. The small size and fragmented nature of the market for handmade rugs leads to slow inventory turnover rates and correspondingly high retail markups.

Handmade rugs are principally produced in China, Turkey, Pakistan, India, Nepal, and Iran and exported to one of three primary distribution hubs: New York, United States; London, United Kingdom; or Hamburg, Germany. From there, rugs move through a wide variety of international wholesale distribution channels to the retail channels. The retail channels include specialty rug stores, department stores, national chain stores, furniture stores, and home improvement centers. In the United States, there are over 220 importers and about 4,600 retail locations offering handmade rugs.

It is estimated that retail sales of new handmade rugs are nearly $1 billion annually in the United States, while used rug sales are over $2 billion annually. On a global basis annual sales of new and used handmade rugs approach $3.4 billion and $8 billion dollars, respectively. These sales levels are achieved despite the inefficiencies in the handmade rug market place.

Because of the extremely slow inventory turnover rate, rug retailers usually maintain only a small inventory of rugs. According to the Oriental Rug Retailers Association, there are 4,602 locations in the United States that sell handmade rugs, each having an inventory of between 50 and 100 rugs in each size category. Although a rug merchant may have between 1,000 and 2,000 rugs in inventory, it is likely that fewer than 100 rugs will be of any specific size and shape. Even fewer rugs will also have a color or other attribute a potential purchaser, or customer, is seeking. The customer may, therefore, have to visit many merchants to locate a handmade rug compatible with their needs and preferences.

In addition, typical consumers are generally not very knowledgeable about handmade rugs. To make an informed buying decision, a potential purchaser must, therefore, invest considerable time and effort learning about handmade rugs. This may be difficult, because unlike the many books, magazines, and television shows related to automobiles, consumer electronics, and other commodity items, there are few resources related to handmade rugs. Not only do consumers lack technical knowledge about handmade rugs, but also they typically do not know what their tastes or preferences in handmade rugs might be.

The burden of educating a customer therefore falls on the rug merchant. The merchant should ensure that a customer understands the many different aspects of handmade rugs and has seen enough rugs to determine their preferences with respect to handmade rugs. Otherwise, a potential purchaser may not purchase a rug believing it to be over-priced. Or, a customer may become dissatisfied with a purchase because of an unrealistic expectation about a rug's future value, or because the rug does not match their preferences.

There are additional inefficiencies in the market for handmade rugs. For example, rug manufacturers, importers, exporters, merchants, and customers often use different terminology to refer to the same characteristic. This lack of a common terminology interferes with communication and the exchange of information within the handmade rug marketplace. For example, when a rug is referred to as being Persian it is not clear whether the rug was actually woven in Iran or whether it was woven in India but is of a Persian style of design.

A related problem is the lack of an equivalent of the Universal Product Code (UPC) system in the rug industry. Lack of a UPC-like system makes it impossible to categorize handmade rugs. As a result, various entities in the rug industry may refer to a rug in literal terms. For example, a rug dealer might describe a rug on its tag or on an invoice as a "blue, contemporary, Persian-Kashan made of wool." However, it is not clear what about the rug is blue or what Kashan refers to.

It is also difficult to assess the true value of a handmade rug because no standard means of classification exists. As a result, some insurance companies may not insure handmade rugs. Similarly, financial institutions are generally unwilling to finance rug purchases because they are unable to accurately appraise the rugs. The handmade rug industry is, therefore, one of the few industries where financing options are few even though average purchases are over $1,000. Potential purchasers are often faced with using cash or high-interest credit cards to finance a purchase-even for a fine handmade rug costing over $100,000.

Lastly, because the rug industry lacks a standard means of classification, there exists no universal method of identifying a specific handmade rug. This makes it impossible for various entities within the rug industry to exchange information about a particular rug. At best, two rug dealers may refer to a rug using arbitrarily-assigned, internal product identification numbers which is cumbersome and prone to errors. For example, in trading among themselves a dealer cannot be sure that a specific rug is being traded, rather than not just a similar rug.

These inefficiencies in the handmade rug market have a negative impact on the overall financial performance of the dealers and retailers. Though margins are high, inventory turnover is extremely slow, reducing return on capital.

Even the simple task of viewing rugs is a slow, tedious, and labor-intensive process. Although some rugs may be hung up on a wall or partition, most rugs are stored flat, one on top of another, in stacks on the floor or on a low platform, so only the rug on top is readily visible. Even though the rug merchant may know where each rug in the inventory is located, it may be necessary to manhandle many rugs to uncover a particular rug for a customer to view.

After expending time and effort showing a potential customer many rugs, it may happen that no rug in the merchant's inventory matches the customer's needs. This is undesirable for the customer, since it means searching through the inventory of yet another rug dealer—assuming there are other dealers within a reasonable distance. It is equally undesirable for the merchant due to the lost sale.

In view of the foregoing, it would, therefore, be desirable to facilitate the buying and selling of handmade rugs.

In addition, it would be desirable to educate customers about handmade rugs and to help them discover their taste or preferences in handmade rugs.

It would also be desirable to provide a standard classification system and terminology for handmade rugs.

It would also be desirable to provide a means of accurately describing and identifying handmade rugs.

In addition, it would be desirable to provide methods and apparatus for accurately appraising a handmade rug, and to enable the development of markets for insuring and financing handmade rugs.

It would also be desirable to provide methods and apparatus by which a customer may view a large inventory of rugs without having to visit many individual rug dealers.

It would also be desirable to provide methods and apparatus to assist a rug dealer reduce the effort required to show rugs to a potential customer.

And it would also be desirable to provide methods and apparatus to reduce the time necessary for a rug buyer and seller to finalize the selection of a rug.

SUMMARY OF THE INVENTION

In view of the foregoing, it is, therefore, an object of the present invention to facilitate the buying and selling of handmade rugs.

In addition, it is an object of the present invention to educate customers about handmade rugs and to help them discover their taste or preferences in handmade rugs.

It is another object of the present invention to provide a standard classification system and terminology for handmade rugs.

It is also an object of the present invention to provide a means of accurately describing and identifying handmade rugs.

In addition, it is object of the present invention to provide methods and apparatus for accurately appraising a handmade rug, and to enable the development of markets for insuring and financing handmade rugs.

It is another object of the present invention to provide methods and apparatus by which a customer may view a large inventory of rugs without having to visit many individual rug dealers.

It is also an object of the present invention to provide methods and apparatus to assist a rug dealer reduce the effort required to show rugs to a potential customer.

And it is an object of the present invention to provide methods and apparatus to reduce the time necessary for a rug buyer and seller to finalize the selection of a rug.

These and other objects of the present invention are achieved by providing a unique system of classifying handmade rugs, and by leveraging the capabilities of the Internet to provide an on-line inventory of handmade rugs available from many disparate sources. Digital images of the rugs in the inventory are captured at very high resolution and characterized according to a classification system of specific rug attributes. The images enable a user, whether a consumer, customer, merchant, or dealer, to view each rug in detail. Images and attributes of rugs are cataloged in a database so that the rug inventory may be searched based on desired attributes of a rug or by means of image analysis and correlation tools.

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which:

FIG. 5 is an exemplary product code and classification system for handmade rugs;

FIGS. 6A–C show exemplary layout attributes of handmade rugs in accordance with the principles of the present invention;

FIGS. 9A and 9B show illustrative simple and advanced attribute-based search forms, respectively; and FIG. 10 is an illustrative screen showing a build-your-own rug type of search interface.

DETAILED DESCRIPTION OF THE INVENTION

Figure 1:
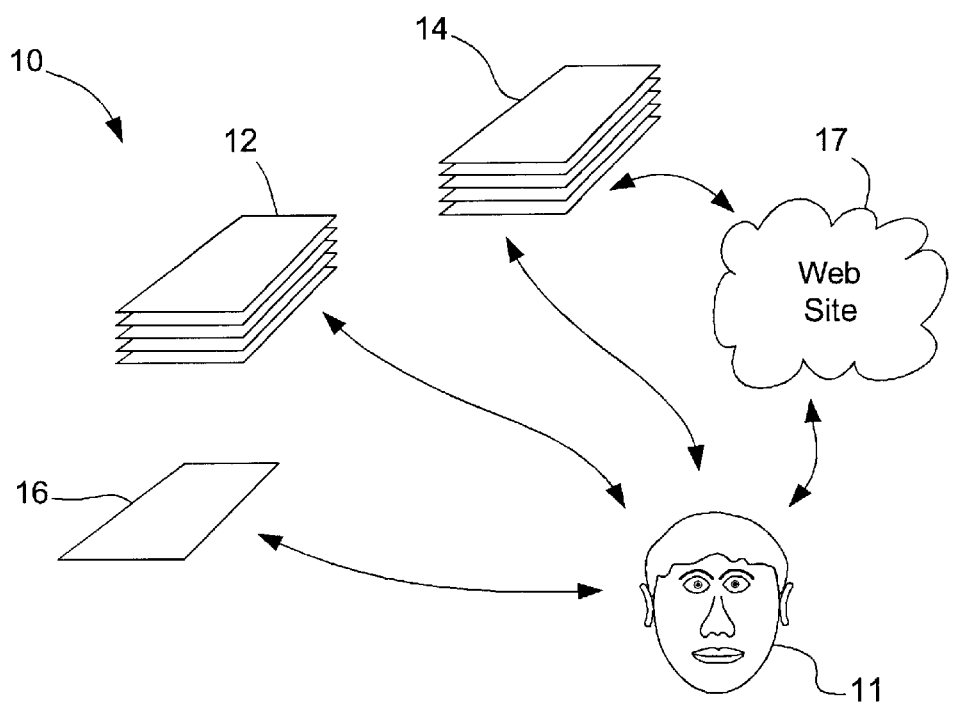
FIG. 1 is a representation of the current marketplace for handmade rugs.

As described in the background of the invention, the market for handmade rugs is highly fragmented. To a rug purchaser, the market appears as a number of merchants 12 and 14 and possibly individuals 16 endeavoring to sell rugs in their possession. This is shown, for example, in FIG. 1, wherein potential purchaser 11 may consult local rug merchants 12 and 14 to learn about, search for, and purchase a handmade rug. Potential customer 11 may have to search through the inventories of merchants 12 and 14 before finding a rug to purchase. Besides merchants 12 and 14, potential purchaser 11 may be able to purchase rug 16 from a private individual. However, purchaser 11 is still faced with the prospect of having to view rugs from many different sources to find a rug that matches their needs and preference.

It may even be possible to view, via the Internet, World Wide Web (web) site 17 containing images of some or all of the rugs in the inventory of merchant 14. However, the available images are generally of low resolution making them less than adequate for discerning subtle differences between rugs, much less actually making a purchase decision.

Figure 2:
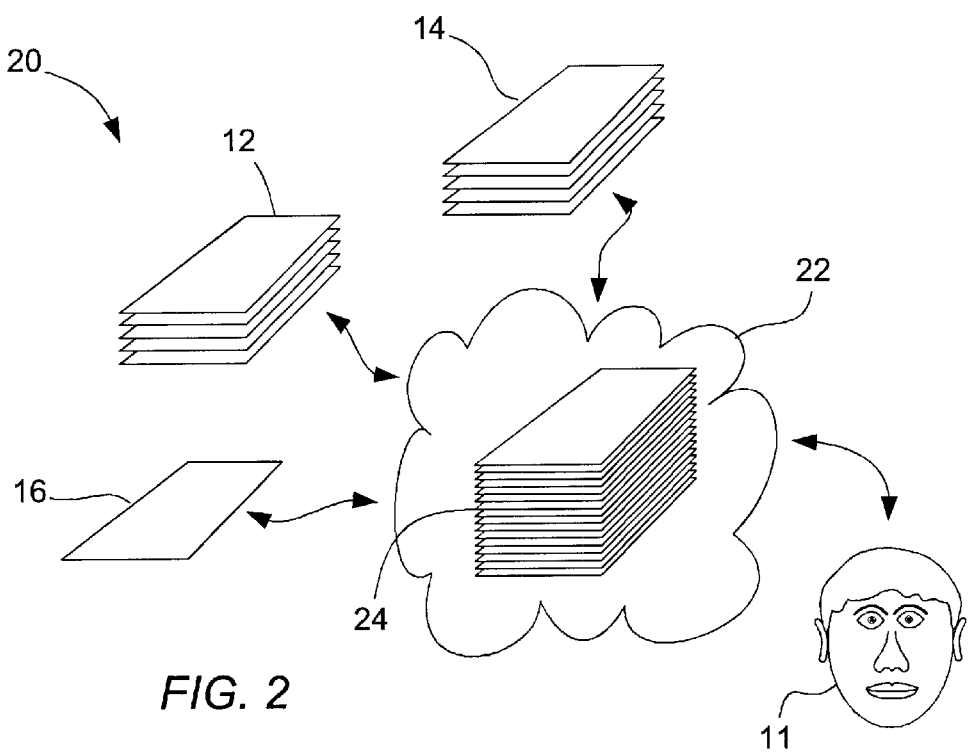
FIG. 2 is a representation of the handmade rug marketplace in accordance with the principles of the present invention.

In accordance with the principles of the present invention, the multimedia capabilities of the Internet are leveraged to facilitate the process of learning about, searching for, finding, and purchasing handmade rugs. As shown in FIG. 2, the present invention is used to consolidate the rug inventories of merchants 12 and 14, and individual 16 and to display images of consolidated inventory 24 on-line. This enables a potential rug purchaser to go to online web site 22 to quickly learn about handmade rugs, discover their preference in rugs, search through the consolidated inventory of many rug merchants to find a rug compatible with their preferences and needs, and ultimately to purchase a rug at lower cost.

Images of rugs in the consolidated inventory are obtained from three main sources. Larger rug distributors are provided high resolution, state of the art image capture technology to capture the images of the rugs in their inventory. For example, image capture system 40 of FIG. 3 may be used to obtain a high resolution image of rug 31. As shown in more detail in FIG. 4, camera 41 is modified by replacing the normal camera back with scanback 43. Instead of film, scanback 43 includes a scanner device for capturing a digital image. A suitable scanback for use with the present invention is available from Better Light of Redwood City, Calif.

Camera 41 is mounted on a gantry (not shown) or otherwise supported over rug 31 and coupled to computer 44. Under the control of computer 44 and camera control unit 45 an image of rug 31 is captured by the scanner device in scanback 43. Image data is transferred from camera 41 to computer 44 for storage and image processing.

Processing may include cropping the image, creating a thumbnail image, format conversion, and compression. This may be done using photo processing software such as Photoshope®, available from Adobe Systems of San Jose, Calif. Processed rug images are then transmitted to server 32 of FIG. 3 via Internet 34.

The rug images may then be further processed, using, for example, AutoEye available from AutoFX of Birmingham, Ala. to enhance the rug image to more accurately portray the actual characteristics of the rug. Software such as LivePicture available from MGI Software of Richmond Hill, Ontario, Canada or MrSid from LizardTech of Seattle, Wash. may be used to create an image file that supports zooming and panning of the image over a network of computers, such as the Internet.

Preferably, the rug images have sufficient resolution so that fine detail of the rugs may be seen. For example, the images should contain sufficient detail so that a user may "zoom in," or magnify, an area of the image to inspect a rug for damage and repairs, or to look at the intricate details of the rug. Although resolutions as low as 480×640 pixels may be sufficient to view some rug details, images having a resolution higher than about 960×1280 pixels are preferred.

Figure 3:
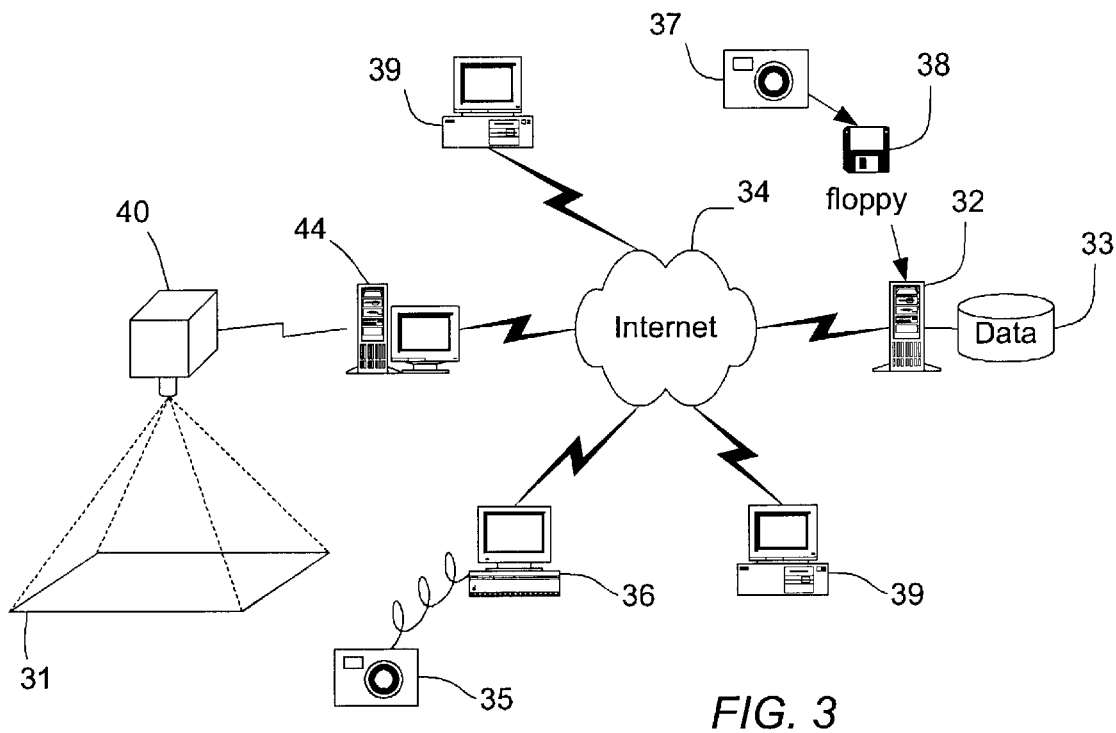
FIG. 3 is a schematic representation of a system for facilitating electronic commerce in handmade rugs.
Figure 4:
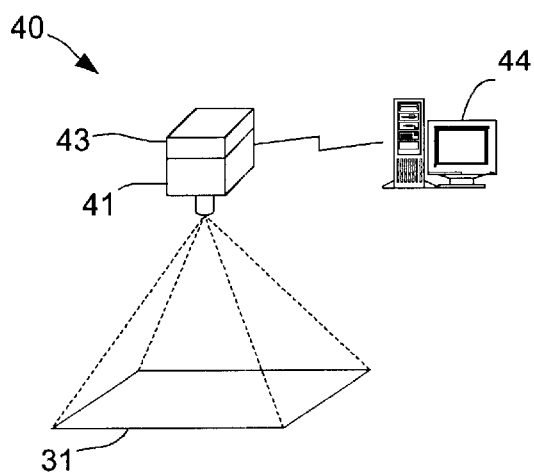
FIG. 4 shows the exemplary, high-resolution, image capture system of FIG. 3 in more detail.

A camera setup as shown in FIG. 4 may provide very high-resolution images of rug 31, enabling a viewer to zoom in on the image to see the finest details of rug 31. However, because an image capture system such as image capture system 40 is expensive, its use is limited to large rug dealers. Smaller rug retailers may use a professional level digital camera to capture the necessary images for transfer to the consolidated inventory. In FIG. 3, for example, professional digital camera 35 may be used to capture images of the rugs in the inventory of a small rug merchant. The images may then be transferred to personal computer 36 for Internet transmission to server 32.

Lastly, individuals may use a consumer level digital camera in a manner similar to that of professional level digital camera 35 of FIG. 3. That is images may be captured using a consumer level digital camera and then transferred over Internet 34 to server 32. Alternatively, individuals may take pictures of their rugs using conventional film camera 37 and have the film images scanned and stored digitally on a medium such as floppy disk 38. For example, many photo developing laboratories are able to store images of photographs on a floppy disk or Kodak® Photo-CD when the film is developed.

Consumer level digital cameras typically have a lower resolution than either image capture system 40 or professional digital camera 35 of FIG. 3. Therefore, it may not be possible to view images at high magnification to see the fine details of a rug. However, multiple images of a rug may be obtained to simulate a zoom capability. For example, an individual may take multiple pictures of a rug: one image of the entire rug, and one or more closeup images showing repairs or intricate detail. Then, when a user desires to see an area of the rug in more detail, one of the closeup pictures may be displayed instead of actually magnifying the original low-resolution image.

Handmade Rug Classification

In addition to obtaining a digital image of a rug, each rug is classified using a standardized classification system describing various characteristics of handmade rugs. The traits or attributes of handmade rugs include: size, color, layout, pattern, style, make, pile, weave, foundation, knot, category, age, and condition. The attributes are shown in the table of FIG. 5 along with an illustrative set of values for each attribute.

The first attribute is the "size" of the handmade rug. This refers to the dimensions and shape of the rug. Dimensions may range from as little as about 2×3 ft. to over 13×20 ft. The most common rug shapes are rectangular, square, round, oval, and runners. Less frequent shapes include regular polygons and various odd shapes.

The second rug attribute is the colors of the rug. As shown in FIG. 6A, a handmade rug typically includes border area 61. Although the border usually has a number of colors, one color predominates; this is the border color. Central field 62 of rug 63 also may include numerous colors. However, generally, one color predominates the central field. This color is called the background color. Further classification of colors includes whether natural or synthetic dyes were used on the rug yarns.

The overall arrangement of motifs or objects on the surface of a rug is referred to as "layout." Common layouts include all-over, medallion, and one-sided, which are shown in FIGS. 6A–C. The all-over layout of FIG. 6A generally consists of numerous related objects or patterns 64 located throughout central field 62 of rug 63 in a connected or symmetric manner.

The most common layout is the medallion layout. As shown in FIG. 6B, the medallion layout includes central element 65, which serves as a focal point of the rug. Central element 65 typically has an oval, circular, diamond, octagonal, hexagonal, or star shape. In addition, the central design may include flowers, birds, animals, or geometric elements.

In a rug having a one-sided, or one-directional layout, the design can be properly viewed from only one side of the rug. Prayer rugs and pictorial rugs fall into this category. An exemplary one-sided design is shown in FIG. 6C.

Another attribute used to classify handmade rugs is "pattern," which refers to the way lines are used to form shapes on a rug. Curvilinear patterns are distinguished by their curving lines, spirals, and contour lines. Often the rugs have a floral motif, which may be semi-realistic or abstract. Paisley is a favorite abstract floral motif found in curvilinear patterns.

Geometric patterns are characterized by rectilinear lines and angular shapes. These patterns are common in Caucasian, Turkoman, and Afghan rugs, as well as many Persian and Turkish rugs.

Lastly, a rug incorporating a depiction of people and animals in scenes from human life or history is classified as having a pictorial pattern. These rugs often show a hunting scene or one or more scenes from an epic story. Usually, a pictorial rug has a one-sided layout.

"Style" refers to the set of instructions used to apply character to a rug. From the style of a rug one can determine where the overall design of the rug originated. Main style classifications may include Persian, Chinese, Turkoman, Caucasian, European, Anatolian, Tibetan, Indian, Baluchi, North African, Native American, and Turkestan. Sub-styles may also be included to further distinguish rug styles.

"Pile" is an attribute that refers to the material used for weaving rugs. Common pile materials include wool, silk, cotton, or a combination of wool and silk.

The attribute "weave" refers to the technique used to weave a rug. There are two major weaving techniques: flat and pile. In a flat weave, which is often used in tapestries, the weft is woven through the warp to form the rug's design. In a pile rug, the pile material is tied or knotted around the warp and weft threads.

"Foundation" refers to the basic structural components of handmade rugs. These components consist of warp and weft which may be made of either wool, silk, cotton, or a combination of these materials.

Pile-woven, or knotted, rugs are created by knots tied around the warp and weft. "Knot" is another attribute used to classify handmade rugs which refers to the knot type and density. The two predominant types of knots are asymmetrical and symmetrical. Knot density is the number of knots per unit area, and may range from about 50 to over 1300 knots per square inch.

"Category," another attribute of handmade rugs, refers to the setting in which a rug is produced. Categories include Nomadic, Village, Workshop, Masterworkshop, or Machined.

"Age" specifies how old a rug is. There are three major time lines: Antique, Semi-antique, and Contemporary.

The last attribute of a handmade rug is its "condition." Handmade rugs are classified according to their overall condition as Fine, Average, or Worn. The condition attribute also identifies portions of a rug that may be damaged or have been repaired.

Initially, rug are classified manually based on knowledge and experience. However, as more images and their associated attributes are collected, many of the attributes may be determined automatically using image analysis and correlation techniques as is described below.

In accordance with the principles of the present invention, the above described system of attributes may be used to accurately describe and categorize handmade rugs. Furthermore, the value of the attributes may be encoded to create a product code similar to the ubiquitous UPC bar code. To create a UPC-like code, the values of the rug attributes may be assigned alpha-numerical codes which are concatenated to form a category specific code which may be affixed to a rug.

For example, the size attribute includes the shape of a rug and has possible values of rectangular, runner, square, round, oval, or odd, which may be assigned codes of 1 through 6, respectively. The size attribute also includes the dimension of a rug which may be encoded as a two digit width (in feet) and a two-digit length (in feet). A code of 10508 would then indicate a rectangular 5'×8' rug. An exemplary UPC code in accordance with the principles of the present invention is also shown in FIG. 5.

Advantageously, the encoding described above results in a UPC-like code that it is printable and may be readily read and interpreted by a human. However, it will be apparent to one of skill in the art that other methods of encoding the attributes of a rug are possible. For example, a binary encoding may be used to reduce storage space or transmission times. Once the image of a rug has been captured and the rug is categorized it may be added to the rug inventory.

The Consolidated Inventory

All of the image, classification data, appraisal, and other information about each rug is loaded into a consolidated inventory. Preferably, the inventory is stored in a large database, such as databases available from Oracle, of Belmont, Calif. Referring back to FIG. 3, the database may be stored on disk memory 33 attached to server 32.

A potential rug purchaser interacts with the database of rug images and data by way of a graphical user interface, such as may be provided by a web browser or similar program. For example, a user may use a web browser on one of computers 37 or 38 to access a web site maintained on server 32 and thereby view the rug images. Among other things, the interface enables the potential customer to learn about handmade rugs in general, to discover their own personal preference in handmade rugs, to search for and view rugs from the consolidated inventory, to assemble a personal gallery of rugs, and to buy or sell a rug.

To enable a user to learn about handmade rugs a hypertext document is provided describing various aspects of handmade rugs, including details about the classification system and corresponding terminology used to describe rugs. Additional topics include information about the geography and people of handmade rug producing regions, the history of handmade rugs, and the tools and techniques used to create a handmade rug. Providing these educational materials facilitates the communication between buyers and sellers of handmade rugs, and helps users better understand other aspects of the present invention.

When shopping for a handmade rug, many consumers are not aware of the many different combinations of color, layout, pattern, and style available in handmade rugs. In accordance with the principles of the present invention, a means of discovering one's preference in handmade rugs is provided. In essence, a small set of rug images is selected such that the selected rugs are representative of the rugs available in the consolidated inventory. The selected images are displayed, and the user is allowed to indicate which, if any, of the images the user may prefer.

The primary attributes that determine a customer's preference in handmade rugs are background color, pattern, layout, and style. Therefore, the set of images should be selected to ensure that the combinations of these attributes are adequately represented. Although the set of images used may be static, it may be awkward if a customer wants to purchase one of the representative rugs only to discover that such a rug is not in the consolidated rug inventory. Therefore, in a preferred embodiment of the present invention, the representative set of images is created from images of rugs actually in the consolidated inventory.

Figures 7A, 7B:
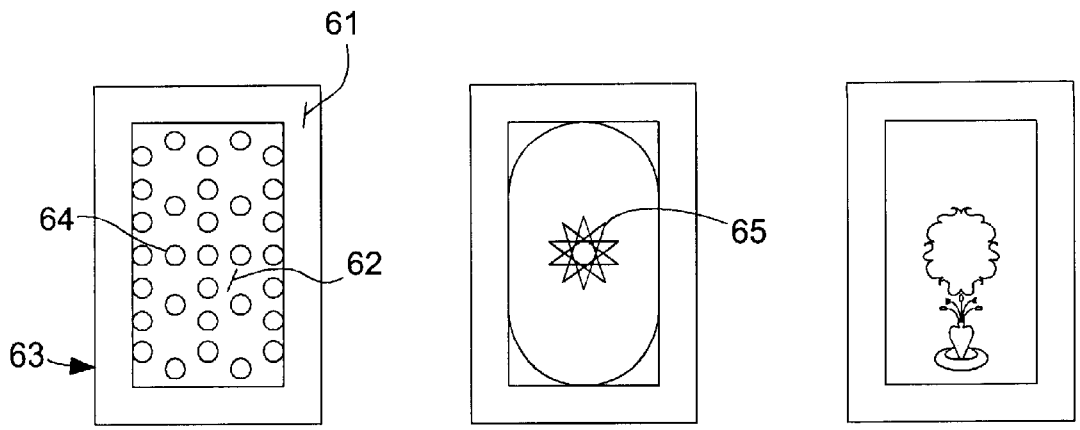
FIGS. 7A and 7B show the distribution of rugs by attribute in an exemplary inventory of rugs.

In the preferred embodiment of the present invention, the consolidated inventory is analyzed to determine the distribution of rugs with regard to background color, pattern, layout, and style. An exemplary distribution is shown in FIGS. 7A and 7B. The distribution information is then used to ensure that the distribution in the selected set of rugs approximates the actual distribution in the consolidated inventory.

Figure 8:
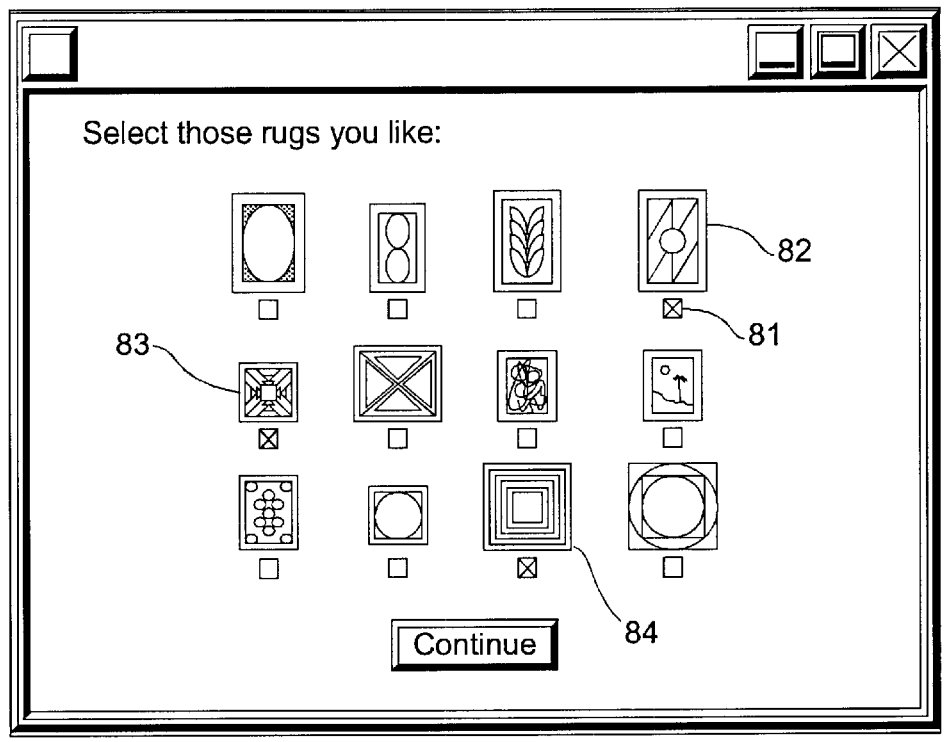
FIG. 8 is an exemplary screen showing a set of representative rugs used in assisting a user to discover their personal preference in handmade rugs

For example, FIG. 7A shows that 24% of the rugs in the inventory are curvilinear-medallion. A representative set of 24 rugs would then have $$24 \times 0.24 = 5.76,$$

or about 6 curvilinear-medallion rugs. Analogously, there should be 5 rugs having a red background color according to the distribution shown in FIG. 7B. Representative rugs are then selected from the inventory and displayed for the user. An exemplary display is shown in FIG. 8. Depending on the number of rugs in the representative set, more than one screen may be required to display the entire set.

Those rugs preferred by the user may be indicate by, for example, clicking on check boxes 81. For example, in FIG. 8, the user has selected rugs 82–84. The user's selections are then analyzed. The attributes of the selected rugs should provide a good indication of the user's preference in handmade rugs. This gives the user a starting point in looking for a suitable handmade rug.

Because the consolidated rug inventory is expected to become very large, viewing all, or a large portion, of the rugs may not be a practical means of searching for a rug. Therefore, in accordance with the principles of the present invention, provisions are included for searching the rug inventory.

One method of searching the consolidated rug inventory is to search based on the attributes used to classify the rugs. Using this type of search, a user is presented with an on-line computer form such as simple search form 91 shown in FIG. 9A, or advanced search form 93 shown in FIG. 9B. Values for the attributes may be selected by the user using text fields 94 or list boxes 95.

Figure 9A:
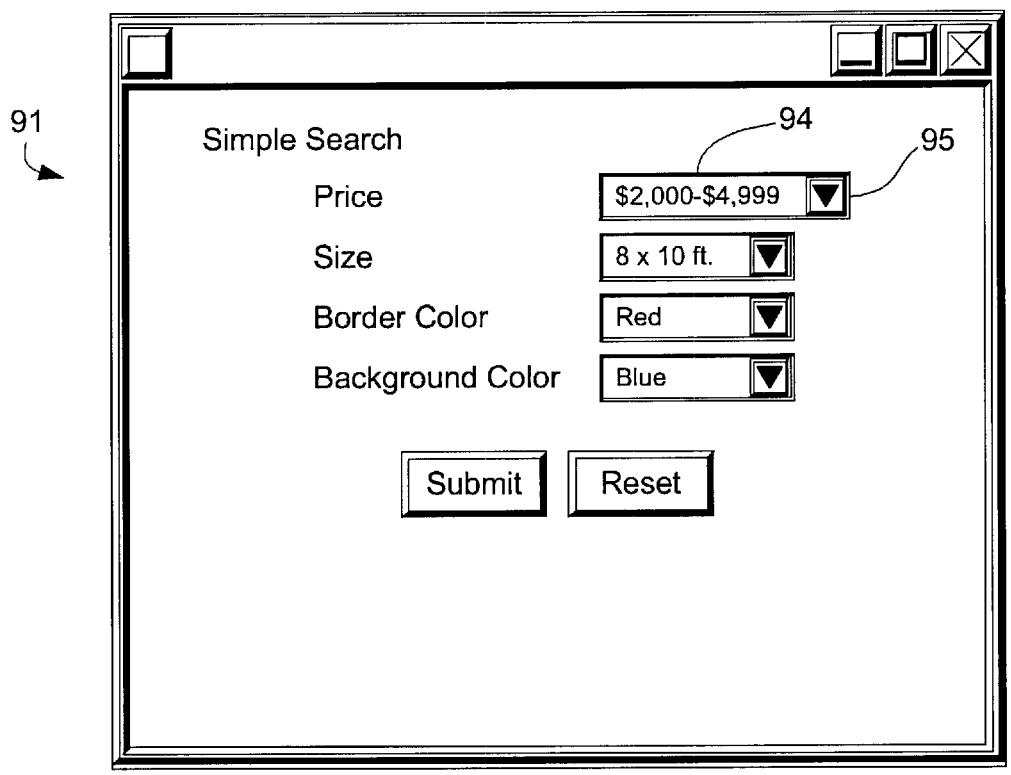

A simple search form only provides options for those attributes typically specified by customers as important factors in making a rug selection. For example, simple search form 91 of FIG. 9A only includes options for list price, border color, background color, and size. In contrast, advanced search form 93 of FIG. 9B provides options for all of the rug attributes.

The advanced search provides the user with finer control over the search process. For example, a user may run a search specifying values for all rug attributes, or may leave some attributes blank, or set to a value indicating the user does not know or does not care about the value of the attribute, as shown by list box 97.

In actually performing the search, the attributes may be combined and encoded in the same format as the UPC-like code described hereinabove. The encoded attributes may then be used as a key to search a similarly encoded index into the consolidated rug inventory. This reduces the effort to perform the search from a thirteen column database query to a single column database query.

In a preferred embodiment of the invention, the search attributes are weighted according to order of importance. This lets a user specify that some attributes are more important than other attributes. For example, a user may indicate that they are somewhat flexible about the pattern of a rug, but firm about colors. Default weights are provided for the attributes so that novice or casual users do not have to be concerned with setting the weights. Whereas more experienced and advanced users may adjust the attribute weights and thereby specify the relative importance of the rug attributes.

In addition to the advanced, form-based search, a text-based search function may be provided to enable powerful boolean searching capabilities for more experienced users. Such a search capability might then enable a user to submit a query such as:

Layout=Medallion AND (Bkgd=Blue OR Bkgd=Green), to find rugs having a medallion layout and a background color of either blue or green.

An alternative search interface is to let a user design their desired rug graphically. This interface provides the user with a blank shape representing the rug and a pallet of tools activated by drag and drop style features, or push button style controls, such as those found in a typical PC-based painting or drawing program. An exemplary interface is shown in FIG. 10.

The user uses the tools to create an image of a rug having characteristics matching their individual preference. For example, colors may be selected from a pallet of colors and 'poured' onto the border of a rug. When completed, the rug image is then analyzed to extract the attributes and a search may be performed. Optionally, if a matching rug is not found the user may choose to have a rug custom manufactured according to the rug image.

Yet another alternative method of searching the rug inventory is to use image searching. In this type of search, a set of images is chosen from the consolidated rug inventory. The images may be chosen randomly or may be the result of a prior search. The set of images is displayed and the user selects from the set the rug that is most appealing or desirable.

An image matching program, such as Visual Retrieval-Ware® available from Excaliber of Vienna, Va., is then used to find rugs in the inventory having an image similar to the selected rug. The results of the search are returned as a new set of images. The user may then select a rug from the new set of images to perform another search. This process is repeated until the user finds a suitable rug.

In one embodiment of the present invention each iteration in the search process is independent of previous searches. However, in another embodiment of the present invention, statistical data is gathered about the selected images to bias the search results. For example, if the user always picks rugs having red borders, then the search can be biased to return mostly rugs with red borders.

Once a search turns up a candidate rug, a user is able to view the images and attributes of the rug in more detail. In viewing the rug images, the user is able to magnify the images and thereby zoom in to see details of the rug which may not be visible when viewing an image of the entire rug. For example, rug details, as well as damaged or repaired areas, may only be visible under high magnification of the affected areas of the rug. A user may select an area of the image, such as by using a mouse or other pointing device, and thereby cause the image of the selected area to be magnified. Alternatively, if the image is a low resolution image, the image may be treated as an image map so that selecting an area of the rug image activates a link to a separate image of the selected area.

Because it may take several sessions for a user to feel confidant that a sufficient number of rugs have been viewed, a user may conduct a search over several sessions. Therefore, provisions are included enabling a user to save images and information about selected rugs in a personal rug gallery. This gives the user the ability to share the images with others. For example, an interior designer may put a number of rugs in a personal gallery to be shown to a client. If a search session is interrupted, the personal rug gallery also gives the user a starting point from which to resume looking for a suitable handmade rug.

Once a suitable rug has been found, the customer may order the rug on-line, using a credit card or electronic funds for the purchase. Alternatively, financing may be provided on-line. This is facilitated by the creation of a large, consolidated inventory of rugs which helps ensure accurate valuation and pricing. Once financing is arranged, the online order is forwarded to the merchant that actually has the rug in stock for drop shipment to either the user, whether a customer or a dealer.

Handmade rugs are not currently individually labeled and tracked. However, in accordance with one aspect of the present invention, rugs may be assigned a unique product identifier (UPI), or serial number. In a preferred embodiment of the present invention, the UPI comprises the 31-character UPC described above followed by a unique 9-digit serial number that is assigned to a rug when it is first appraised and entered into the system of the present invention. Alternatively, a serial number may be based on a manufacturer identification code combined with a manufacturer supplied sequence number.

The UPI may then be included on a label or other device affixed to the rug. Since the average rug has many owners over the course of its life, the UPI enables a merchant to track the ownership of a rug and seek to be the dealer of choice when a particular rug is resold.

In a preferred embodiment of the present invention, the UPI is used to maintain a history of each rug, in addition to the rug attributes discussed above. A user is, therefore, able to look at the history of each rug. For example, the history may include a list of prior owners, previous prices paid for the rug, repairs made to the rug, or other interesting bits of information that may alter the value of a rug.

Maintenance of rug histories also enable the development of actuarial data about handmade rugs. For example, data mining techniques may be used to determine how often rugs are damaged or destroyed, as well as their average 'life expectancy.' This information is necessary to the creation of an efficient market for insuring handmade rugs.

The maintenance of a rug's history also facilitates subsequent resale of the rug. If the rug is already in the system, it may not need to be imaged again when put up for resale. Furthermore, a buyer of a handmade rug may elect to keep the rug in the available inventory. The rug will then appear to be on the market. This makes a handmade rug a more liquid asset than was previously possible.

The present invention is therefore useful in facilitating the process of finding a rug suitable for a potential customer. It may be used directly by the customer, as by browsing the web. Alternatively, the system of the present invention may be used by individual rug merchants. Advantageously, the system enables a merchant to show a potential customer a rug without the manual labor required to search through stacks of rugs in their own inventory. Furthermore, the invention enables the merchant to show the customer rugs in other merchant's inventories, giving the appearance of a much larger inventory of rugs. In the event the customer desires to purchase a rug that is in another merchant's inventory, the merchant may endeavor to swap or purchase the rug from the other merchant on behalf of the customer.

CONCULSION

While preferred illustrative embodiments of the present invention are described above, it will be evident to one skilled in the art that various changes and modifications may be made without departing from the invention. For example, 'Machine-made' may be added to the possible values of the "category" attribute so that the system of the present invention may be expanded to include machine-made rugs. Analogously, the methods and apparatus of the present invention may be used for items other than rugs, such as area rugs, works of art, and antique furniture. It is therefore to be understood that the described embodiments are provided for purposes of illustration and not of limitation, and that the appended claims are to cover all such changes and modifications which fall within the true spirit and scope of the invention.

What is claimed is:

1. A method of classifying an area rug, the method comprising:

associating a set of attributes with the area rug, the attributes including: size, color, layout, pattern, style, make, pile, weave, foundation, knot, category, age, and condition;

obtaining an image of the area rug;

inspecting the image; and determining values for each of the attributes based on the inspection.

2. The method of claim 1 further comprising storing the image and associated attributes in a database containing a plurality of images and associated attributes.

3. The method of claim 2 wherein the stored images are high-resolution images.

4. The method of claim 3 wherein the images have a resolution high enough to enable a user to zoom in and view the details of a user selected portion of the rug.

5. The method of claim 4 wherein the images have a resolution of greater than about 1000×1500 pixels.

6. The method of claim 1 wherein the steps of inspecting and determining are-done manually.

7. A method of classifying an area rug, the method comprising:

providing a database comprising a plurality of images of area rugs, wherein each image has an associated set of attributes including: size, color, layout, pattern, style, make, pile, weave, foundation, knot, category, age, and condition;

obtaining an image of the area rug being classified;

searching the database to find a first set of images similar to the image of the rug being classified;

determining a correlation among the attributes associated with the images in the first set of images;

assigning values to the attributes associated with the area rug being classified responsive to the determined correlation.

8. The method of claim 2 further comprising assigning a code for each possible value of each attribute.

9. The method of claim 8 further comprising concatenating the codes for the value of each attribute associated with the area rug being classified to create a product code.

10. The method of claim 9 wherein a serial number is combined with the product code to form a unique identifier.

11. The method of claim 10 wherein the product identifier is affixed to the area rug being classified.

12. Apparatus for classifying an area rug, the apparatus comprising:

a computer programmed with a database associating an image of a area rug with a predetermined set of attributes that characterize area rugs, wherein each attribute has a value selected from a predetermined list of values, the computer further programmed to:

determine values for each attribute in the predetermined set of attributes by searching the database for images similar to an image of the area rug being classified and determining a correlation among values of the attributes associated with each image in the database; and associate with the area rug a value for at least one attribute in the predetermined set of attributes responsive to the determined correlation.

13. The apparatus of claim 12 wherein the step of determining values for the set of attributes comprises steps of:

displaying the image of the area rug being classified to a user; and accepting from the user an indication of the values for each attribute in the predetermined set of attributes.

14. The apparatus of claim 12 wherein the stored images are high-resolution images.

15. The apparatus of claim 14 wherein the images have a resolution high enough to enable a user to zoom in and view the details of a user selected portion of the rug.

16. The apparatus of claim 15 wherein the images have a resolution of greater than about 1000×1500 pixels.

17. The apparatus of claim 12 wherein each possible value of each one of the predetermined set of attributes has an associated code, and wherein the computer is further programmed to concatenate the codes corresponding to the attributes associated with the area rug being categorized to form a product code.

18. The apparatus of claim 17 wherein the computer is further programmed to combine a serial number with the product code to form a unique identifier.

19. The apparatus of claim 18 further comprising an output device wherein the computer is programmed to output either the product code or product identifier so that it may be affixed to the rug being classified.

20. The apparatus of claim 12 wherein the predetermined set of attributes includes at least one of: size, color, layout, pattern, style, make, pile, weave, foundation, knot, category, age, and condition.

21. The apparatus of claim 12 wherein the predetermined set of attributes includes size, color, layout, pattern, style, make, pile, weave, foundation, knot, category, age, and condition.

* * * * *